(12) United States Patent
Jain et al.

(10) Patent No.: US 12,164,353 B2
(45) Date of Patent: Dec. 10, 2024

(54) FREQUENCY/STATE BASED POWER MANAGEMENT THRESHOLDS

(71) Applicants: Advanced Micro Devices, Inc., Santa Clara, CA (US); ATI Technologies ULC, Markham (CA)

(72) Inventors: Ashish Jain, Austin, TX (US); Shang Yang, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/936,740

(22) Filed: Sep. 29, 2022

(65) Prior Publication Data

US 2024/0111351 A1    Apr. 4, 2024

(51) Int. Cl.
*G06F 1/3206* (2019.01)

(52) U.S. Cl.
CPC .................. *G06F 1/3206* (2013.01)

(58) Field of Classification Search
CPC .................................................. G06F 1/3206
See application file for complete search history.

(56) References Cited

U.S. PATENT DOCUMENTS

| | | | |
|---|---|---|---|
| 8,775,843 B2 | 7/2014 | Frid et al. | |
| 9,575,537 B2 | 2/2017 | Ignowski et al. | |
| 9,977,439 B2 | 5/2018 | Park et al. | |
| 2012/0297232 A1* | 11/2012 | Bircher | G06F 1/324 |
| | | | 713/500 |
| 2016/0179177 A1 | 6/2016 | Henry et al. | |
| 2016/0349828 A1* | 12/2016 | Weissmann | G06F 1/3296 |

FOREIGN PATENT DOCUMENTS

WO    2008016791 A1    2/2008

* cited by examiner

*Primary Examiner* — Gary Collins
(74) *Attorney, Agent, or Firm* — Kowert, Hood, Munyon, Rankin & Goetzel, P.C.; Rory D. Rankin (57) ABSTRACT

A system and method for determining power-performance state transition thresholds in a computing system. A processor comprises several functional blocks and a power manager. Each of the functional blocks produces data corresponding to an activity level associated with the respective functional block. The power manager determines activity levels of the functional blocks and compares the activity level of a given functional block to a threshold to determine if a power-performance state (P-state) transition is indicated. The threshold is determined in part on a current P-state of the given functional block. When the current P-state of the given functional block is relatively high, the threshold activity level to transition to a higher P-state is higher than it would be if the current P-state were relatively low. The power manager is further configured to determine the thresholds based in part on one or more of a type of circuit being monitored and a type of workload being executed.

20 Claims, 5 Drawing Sheets

*Transition from P-state Px to P-state Py*

*Unit Type*

|  | P4->P3 | P3>P2 | P2>P1 | P1>P0 |
|---|---|---|---|---|
| Unit A | 40 | 50 | 75 | 92 |
| Unit B | 45 | 50 | 70 | 87 |

510

*Transition from P-state Px to P-state Py*

*Workload Type*

|  | P4->P3 | P3>P2 | P2>P1 | P1>P0 |
|---|---|---|---|---|
| Workload A | 35 | 55 | 85 | 90 |
| Workload B | 50 | 60 | 90 | - |

*FIG. 5*

FREQUENCY/STATE BASED POWER MANAGEMENT THRESHOLDS

BACKGROUND OF THE INVENTION

Field of the Invention

This invention relates to computing systems, and more particularly, to efficient management of processor discrete operating points.

Description of the Relevant Art

The power consumption of modern integrated circuits (IC's) has become an increasing design issue with each generation of semiconductor chips. As power consumption increases, more costly cooling systems such as larger fans and heat sinks are utilized to remove excess heat and prevent IC failure. However, cooling systems increase the system cost. The IC power dissipation constraint is not only an issue for portable computers and mobile communication devices, but also for high-performance superscalar microprocessors, which may include multiple processor cores, or cores, and multiple pipelines within a core.

Modern processors are capable of operating at multiple power-performance states (P-states). The maximum P-state includes a maximum operating frequency and the minimum P-state includes a minimum operating frequency. Intermediate discrete P-states include given scaled values for a combination of the operating frequency and the operational voltage. Typically, the computing system has components (e.g., cores) capable of operating at any of several P-states and a given threshold is used to determine if an increase or decrease in P-state is indicated. One example is to compare the activity level of a processor core to an activity level threshold of 65%. If the activity level increases to this threshold, then an increase in P-state is initiated. Such a threshold can be used to determine transitions between the multiple P-states available to the core. One disadvantage of such an approach is if fails to consider the relative performance to power characteristics at different P-states. Consequently, excess power consumption may occur without receiving a commensurate benefit.

In view of the above, improved methods and mechanisms for determining when to transition between P-states are desired.

SUMMARY OF EMBODIMENTS OF THE INVENTION

Systems and methods for managing multiple discrete operating points to create a stable virtual operating point are contemplated.

In one embodiment, a processor comprises several functional blocks and a power manager. Each of the functional blocks produces data corresponding to an activity level associated with the respective functional block. The power manager determines activity level of the functional blocks and compares the activity level of a given functional block to a threshold to determine if a power-performance state (P-state) transition is indicated. The threshold is determined in part on a current P-state of the given functional block. When the current P-state of the given functional block is relatively high, the threshold activity level to transition to a higher P-state is higher than it would be if the current P-state were relatively low. Setting activity level thresholds is based in part on the relative performance per power benefit of changing to a different P-state.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

The power consumption of IC's, such as modern complementary metal oxide semiconductor (CMOS) chips, is proportional to at least the expression $fV^2$. The symbol f is the operational frequency of the chip and the symbol V is the operational voltage of the chip. In modern microprocessors, both parameters f and V may be varied during operation of the IC. For example, during operation, modern processors allow users to select one or more intermediate power-performance states between a maximum performance state and a minimum power state.

Software, such as an operating system or firmware, or hardware may select a particular P-state based on at least a projected time to change states, a selected power limit, workload characteristics, and inputs from on-chip power monitors corresponding to a current workload. For example, when an activity level of a computing component is detected to have reached a given threshold, an increase in power P-state may be initiated assuming the component is not already at a maximum P-state. In this manner, performance of the computing system doesn't decline under a relatively heavy workload. As noted above, transitions between P-states can be determined (in part) on an activity level reaching a threshold. In the discussion below, methods and mechanism are described that consider the relative performance to power characteristics at different P-states when determining the thresholds at which P-state transitions occur.

Figure 1:
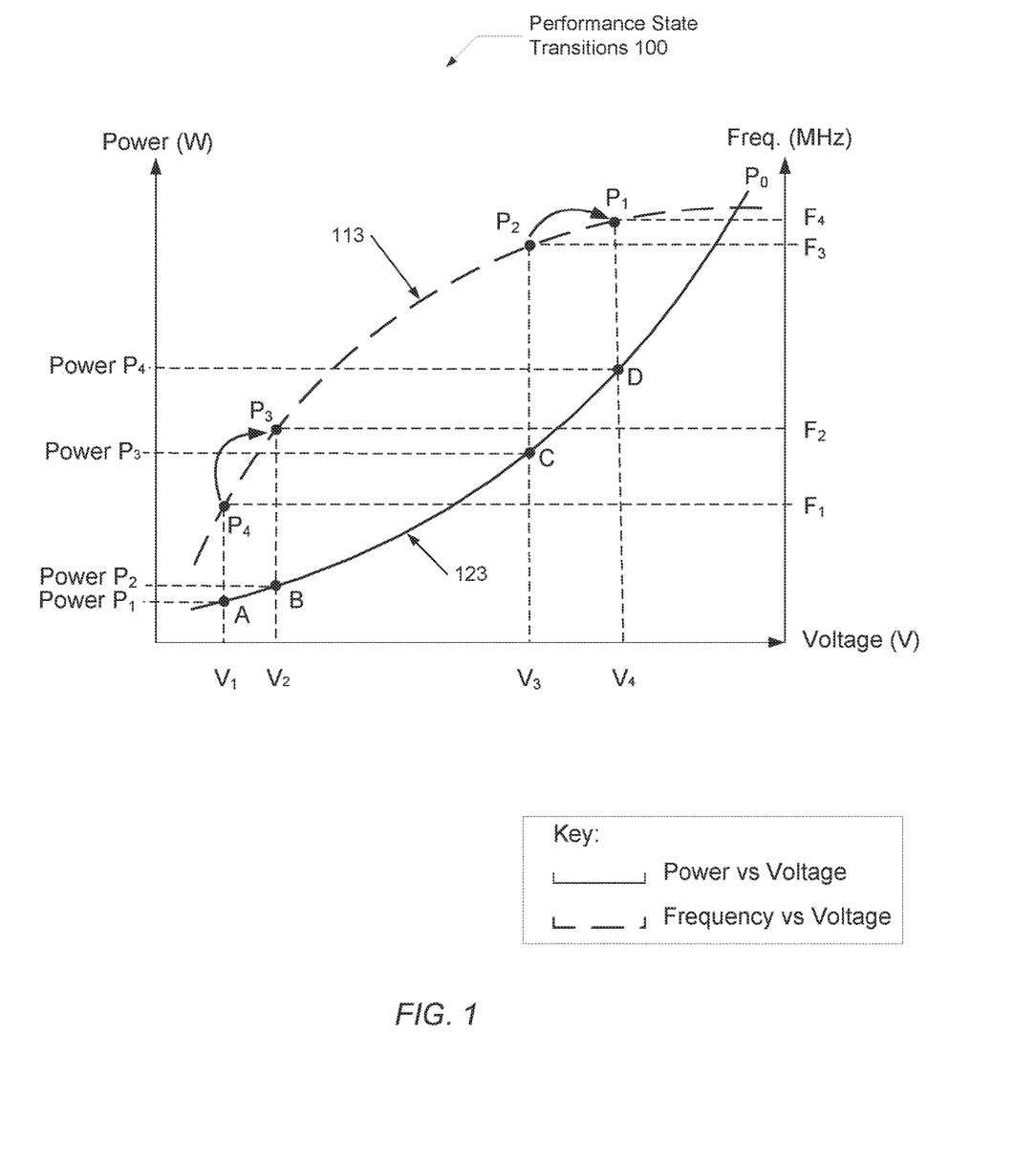
FIG. 1 is a generalized block diagram of one embodiment of power-performance state transitions for a semiconductor chip.

Referring to FIG. 1, one embodiment of power-performance state transitions 100 for a semiconductor chip is shown. Two curves are shown in the diagram illustrating non-linear (e.g., cubic or quadratic) relationships between power versus voltage and frequency versus voltage. Five discrete power-performance states (P-states) are shown in the diagram denoted as P0 to P4. A small number of discrete P-states are shown to simplify the diagram. Although only five discrete P-states are shown, other numbers of discrete P-states may be supported.

In the diagram shown, the P-state $P_4$ may correspond to a discrete state with a lowest performance of all the supported discrete states and comprises the lowest operational frequency. In addition, the P-state $P_4$ may correspond to a discrete state with a lowest power consumption of all the supported discrete states and comprises the lowest operational voltage. On the other hand, the P-state $P_0$ may correspond to a discrete state with a highest performance of all the supported discrete states and comprises the highest operational frequency. In addition, the P-state $P_0$ may correspond to a discrete state with a highest power consumption of all the supported discrete states and comprises the highest operational voltage. Typically, the endpoint discrete states represented by P-states $P_0$ and $P_4$ define a region of predictable performance. Therefore, configuring a processor to support multiple P-states, or operating points, along the non-linear frequency versus voltage curve may provide stable, optimal utilization of power and delivery of performance for the semiconductor chip, such as a processor. In some implementations, the management of the P-states may conform to an industry standard such as the Advanced Configuration and Power Interface (ACPI) standard. In other implementations, the management may differ from the ACPI standard.

As can be seen from the frequency vs voltage curve 113 in the diagram, the curve 113 is relatively steep at lower voltage levels and flattens out at higher voltage levels. Conversely, the power vs voltage curve 123 is seen to be flatter at the lower voltage levels and steeper at the higher voltage levels. When considering power performance state changes (P-state changes), it can be seen that the benefit achieved from a given increase in power diminishes as the voltage increases. In other words, the performance per watt decreases as we move to higher voltage and performance levels. For example, FIG. 1 illustrates a voltage that corresponds to each of the power states $P_4$-$P_0$. The state $P_4$ corresponds to a voltage of $V_1$, $P_3$ corresponds to a voltage of $V_2$, $P_2$ corresponds to a voltage of $V_3$, and $P_1$ corresponds to a voltage of $V_4$. Each of these voltages is plotted on the power vs voltage curve 123 as points A, B, C, and D, respectively. Each of points A, B, C, and D, is also correlated with a given power (Power $P_1$-Power $P_4$) on the Power axis. If a P-state increase occurs from P-state $P_4$ to $P_3$, the voltage is increased from $V_1$ to $V_2$, power consumption increases from Power $P_1$ to Power $P_2$, and operating frequency increases from $F_1$ to $F_2$. Increases in operating frequency generally translate to performance increases. Also shown is a P-state change from state $P_2$ to P-state $P_1$. In this case, the voltage increased from $V_3$ to $V_4$, power consumption increased from Power $P_3$ to Power $P_4$, and frequency increased from $F_3$ to $F_4$. What can be seen from these examples, is a modest increase in power consumption from Power $P_1$ to Power $P_2$ results in a relatively significant increase in operating frequency $F_1$ to $F_2$ and performance. On the other hand, a relatively significant increase in power consumption from Power $P_3$ to Power $P_4$ results in a modest increase in frequency, and performance, from $F_3$ to $F_4$.

Given the above observations, in one implementation, the power management of a computing system is configured to use different activity level thresholds when transitioning between P-states. For example, in order to take into account the reduced benefit of increasing power to a particular component of the computing system when the component is operating at a relatively high P-state, the system makes it more difficult (increases the difficulty) to transition to a higher P-state by comparing a current activity level to an increased activity level threshold as discussed below. It is noted that while the discussion herein describes relatively high and relative low P-states, these states are not necessarily high or low in absolute terms (e.g., with respect to states in which the system is capable of operating). Rather, a relatively high P-state refers to a P-state that is higher than another P-state in which the system (or circuit) can operate. Conversely, a relatively low P-state is lower than another P-state in which the system can operate. In other words, the P-states are relative to other P-states. In some cases, a relatively high P-state may in fact be one of the higher P-states at which the system can operate. Similarly, a relatively low P-state may in fact be one of the lower P-states at which the system can operate. However, it is to be understood this is not required.

Figure 2:
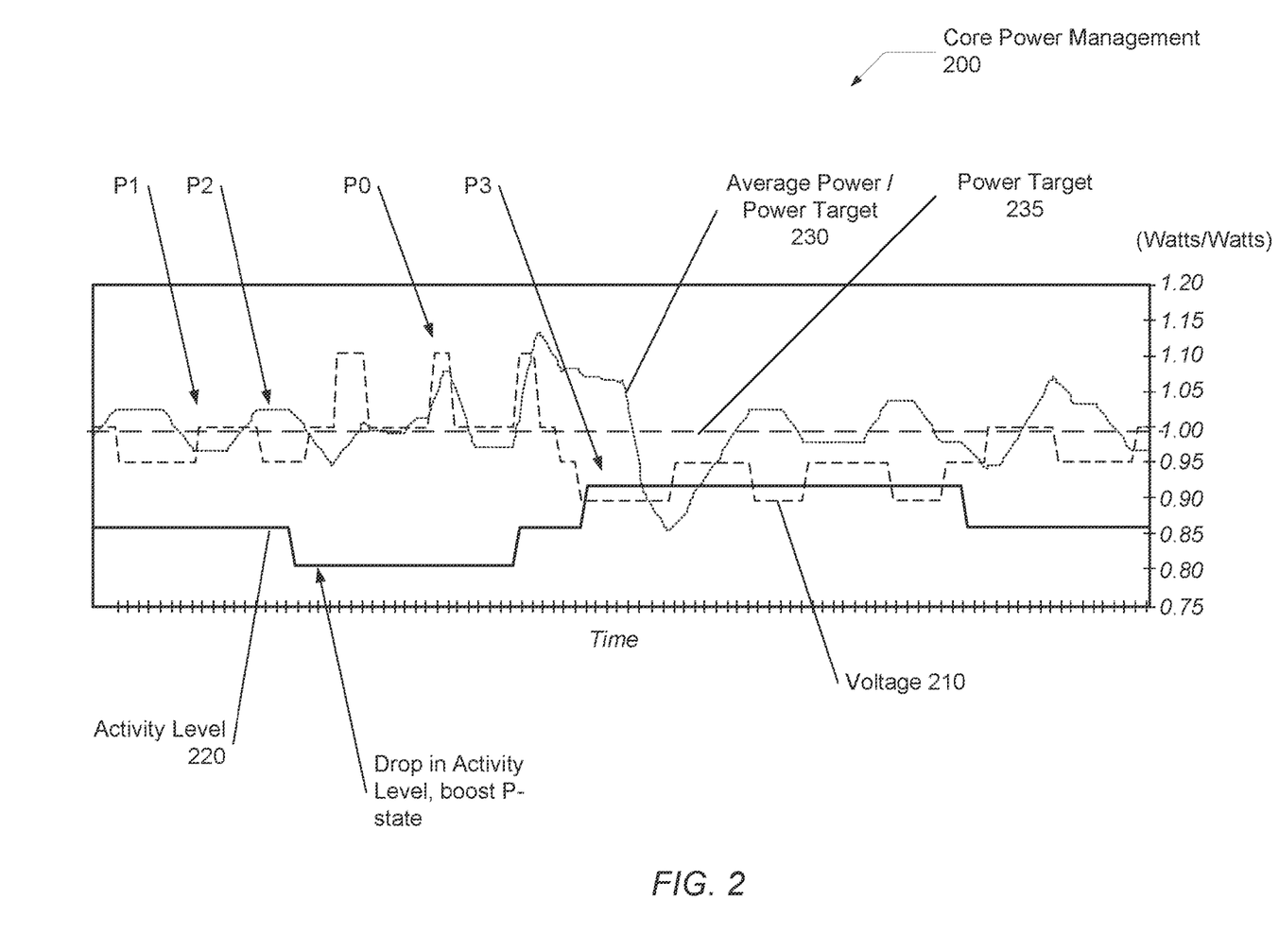
FIG. 2 is a generalized block diagram of one embodiment of core power management.

Turning now to FIG. 2, one embodiment of a core power management system 200 is shown. Changes to an operational voltage 210 and a measured activity level 220 over time are shown. In addition, a power target 235 and an average power versus a power target ratio 230 is shown over time. As shown in FIG. 2, there are P-state transitions both when an activity level experiences a change and when the activity level is constant. In the diagram, the P-state transitions correlate with changes in the operating voltage 210. Some P-state values are labeled in the diagram. For example, with a constant activity level 220, a P-state $P_1$ transitions to P-state $P_2$, which has a lower operating voltage as shown in the diagram. Toggling between P-state values when the measured activity level is constant may be referred to as P-state dithering. The P-state dithering may be used to maintain a ratio close to unity between an average power consumed on the chip and a power target, such as a TDP value. By maintaining such a ratio close to unity, the chip may seek to maximize performance while still consuming a desired amount of power (e.g., an amount of power dissipated by a corresponding cooling system).

Figure 3:
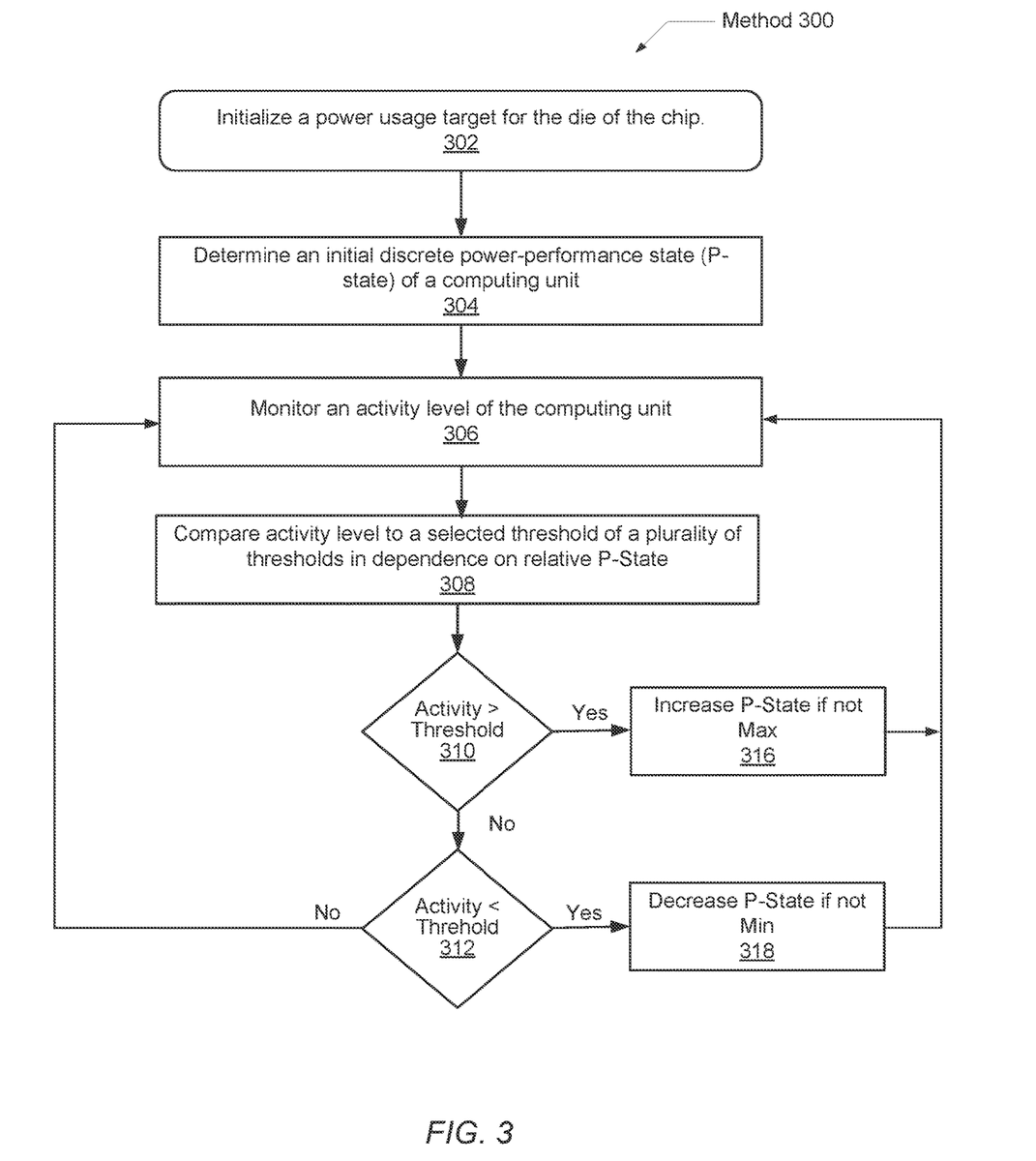
FIG. 3 is a flow diagram of one embodiment of a method for managing multiple discrete operating points to create a stable virtual operating point.

Turning now to FIG. 3, one embodiment of a method 300 for managing multiple discrete operating points to create a relatively stable virtual operating point is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 302, a power usage target for the die of a chip is initialized. Any of a variety of methods for selecting a power usage target, including those described earlier, may be used. In block 304, an initial discrete power-performance state (P-state) for the die is determined at a given workload. Software, such as firmware, and/or hardware may determine the P-state. Activity levels of components within the computing system are then monitored 306. In various implementations, these activity levels are based on performance counters, sensors of various types (e.g., current, temperature, etc.), and on. Additionally, the activity levels of any of a variety of types of circuits in the computing system can be monitored, including processing cores, memory subsystems, I/O subsystems, and otherwise.

These monitored activity levels are then compared to various thresholds depending on the current P-state of the circuit being monitored. For example, if the circuit being monitored is a processing core, then the current P-state of the processing core is determined. The current P-state of circuits in the computing system is tracked by power management and/or other system component(s). Based on the current P-state, selected thresholds are identified that are used to determine if a transition to a new power-performance (P-state) is indicated. For higher P-states, the thresholds identify higher (increased) activity levels before a transition to a higher P-state is indicated. For lower P-state levels, the identified thresholds identify lower activity levels required to transition to a higher P-state. The current activity level of the monitored circuit is then compared 308 to the selected activity level thresholds required to move to a different P-state (e.g., either higher or lower). If the activity level is greater (310) than a threshold that indicates a transition to a higher P-state, then the current P-state of the circuit is increased if it is not already at a maximum P-state 316. Other conditions may also prevent a transition to a higher P-state, such as a user indicated low power mode, current operation on battery power, or otherwise. If the activity level does not exceed such a threshold, then a determination is made as to whether the activity level has fallen below (312) a threshold that indicates a P-state decrease 312. If so, then the P-state is decreased 318. However, as noted above, various other conditions may prevent a P-state decrease.

In various implementations, selected thresholds identified in block 308 may also be based in part on characterization data for various types of workloads. For example, by executing many different types of workloads under different conditions, changes in performance vs power consumption can be evaluated. This information can then be used to generate thresholds for use in determining whether a transition to a higher P-state (or lower P-state) is indicated. In some implementations, these thresholds are then embedded is power management circuitry, programmed into the device, or otherwise. In implementations wherein thresholds selected are based in part on the type of workload(s) currently executing, the type of workload is one of the parameters considered. In some implementations, an explicit indication of a type of workload may be available. In other implementations, the type of workload may be inferred based on various performance counters and/or other runtime information. In various implementations, thresholds vary based on the type of functional block (e.g., a memory system vs a graphics processing unit). These and other embodiments are possible and are contemplated.

In various implementations, thresholds are determined, or estimated, based at least in part on changes (as determined by characterizations or otherwise estimated) in performance per power state change(s). As an example, comparisons between the performance increase of a circuit in relation to power increase are determined at various thresholds. If it is determined that the performance increase (or estimated change) that would result from a power state change (i.e., a given increase in power consumption) is relatively small, then a change to the higher power state is disfavored and a higher threshold is used to determine when an increase in power-performance state occurs. Alternatively, if the relative performance increase for a given power state change is relatively large, then the threshold for transitioning to the higher performance set to a lower value.

As one example, if allocating 10 watts of additional power to a functional unit (circuit) to increase from a current power-performance state A to a higher power-performance state B would result in an increase in system performance of 2%, a first threshold may be used when deciding to change to the higher power-performance state. If allocating 10 watts of additional power to the functional unit to increase from a current power-performance state C to a higher power-performance state D would result in an increase in system performance of 15%, then a second threshold is used when deciding to change to the higher power-performance state. In this case, the performance to power increase per watt of the circuit is $2/10=0.2$ in the first case and the performance to power increase per watt of the circuit is $15/10=1.5$ in the second case. In these examples, the second case presents a higher relative performance to power increase than the first case. Accordingly, a threshold for transitioning to the higher power-performance state in the first case is higher than for the second case. In other words, it is easier for the transition to occur in the second case given that the benefit (in terms of power/watt) is determined to be greater than the first case. In this manner, various thresholds are determined for transitioning between states based on relative performance to power determinations (or predictions). In these implementations, the thresholds used to determine when transitions between power-performance states occur are based on the determined (or estimated) power to performance changes. In this manner, thresholds are set to increase performance per watt of the system.

It is noted that transitions to lower power-performance states are also determined based on relative performance to power determinations. For example, if it is determined that a lower power (consumption) state (P-state) would have a relatively small (or no) decrease in performance, then a transition to the lower power-performance state is made easier by setting a higher threshold for transitioning to the lower P-state (e.g., a transition to the lower P-state is permitted if the activity level is below 95%). Conversely, if it is determined that a lower power (consumption) state would have a relatively large decrease in performance, then a transition to the lower power-performance state is made more difficult by setting a lower threshold for transitioning to the lower P-state (e.g., a transition to the lower P-state is permitted if the activity level is below 10%). As an example, a system may support ten different power-performance levels 1-10. When the system (or a component of the system) is currently operating at a P-state of 6, activity threshold levels indicate whether a transition to a higher P-state (7) or a lower P-state (5) is indicated. For example, if the activity level rises above a level of 80%, then a transition to P-state 7 is indicated. If the activity level falls below 60%, then a transition to lower P-state 5 is indicated. In other words, in this example, if the current P-state is 6 and the activity level falls within the range 60-80%, then a P-state change is not indicated. If the activity level is above the range 60-80%, then an increase in P-state is indicated. If the activity level falls below the range 60-80%, then a decrease in P-state is indicated.

As discussed above, different thresholds and ranges may be indicated for other P-states. As noted, other conditions may prevent an increase or decrease in P-state. As such, in various implementations, a new P-state being "indicated" does not necessarily mean a transition to the new P-state much or will occur. Rather, such an indication means the threshold conditions for transitioning to a new P-state have been met. One example of a condition that can prevent a change in P-state even when the threshold condition is met is during play of a video game in which the highest performance is desired. In such a case, a threshold indication that a transition to a lower P-state is indicated. However, in order to avoid even a relatively small decrease in performance, the change in P-state is prevented. For example, settings associated with the game may indicate a desired level of performance that causes the system to operate at a highest possible level (i.e., while avoiding overheating, etc.). It is also noted that in various implementations, that when comparing activity levels to thresholds (e.g., as shown in FIG. 3), a change in P-state that skips over one or more intermediate P-states can occur. For example, in block 308 of FIG. 3 when comparing an activity level to thresholds, multiple higher and/or lower P-state thresholds may be compared against. If conditions are met for transitioning directly to a P-state much lower or much higher are present, a direct transition to the much lower or higher P-state can occur. These and other implementations are possible and are contemplated. Numerous such implementations are possible and are contemplated.

Figure 4:
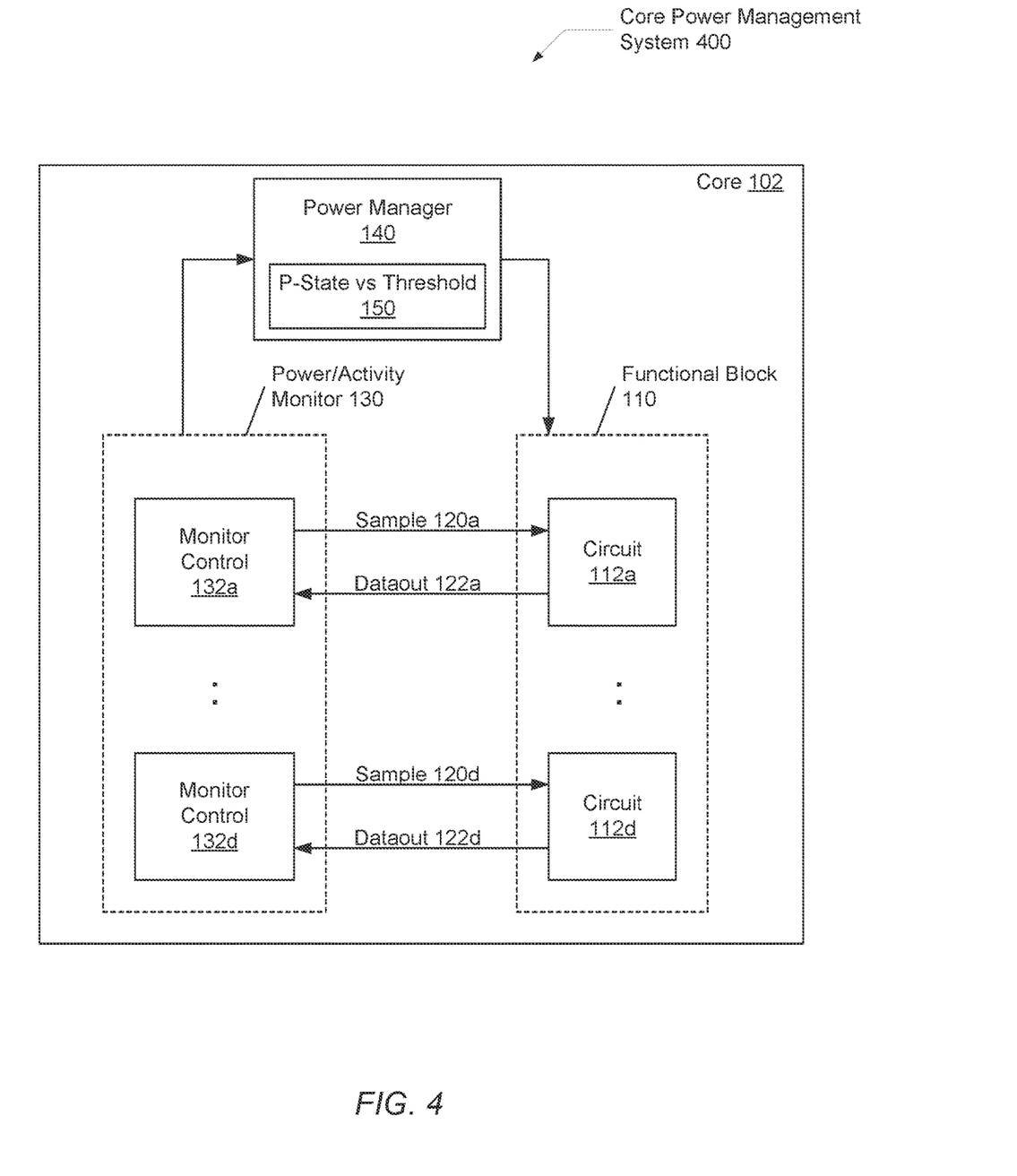
FIG. 4 is a generalized block diagram of one embodiment of a core power management system.

Referring to FIG. 4, one embodiment of a core power management system 400 is shown. Here, core 102 may be any integrated circuit (IC). In one embodiment, core 102 may be a processor core (e.g., of a central processing unit, graphics processing unit, or otherwise). A processor core may have an on-die instruction and data cache. The processor core may be a superscalar processor with a single pipeline, multiple pipelines, or a processor core with parallel computation capability. In another embodiment, core 102 may be an application specific IC (ASIC). Any transistor family may be used to implement core 102.

A functional block 110 may include transistors configured to perform logic functions, data storage, or otherwise. For power management purposes, functional block 110 may be divided into circuits 132a-132d. As used herein, elements referred to by a reference numeral followed by a letter may be collectively referred to by the numeral alone. For example, circuits 132a-132d may be collectively referred to as circuits 132. In one embodiment, circuits 132 may not correspond to functional components of a processor, such as a reorder buffer, a memory management circuit, an execution circuit, and so forth. Rather, Monitor Control circuits 132 may be selected based on the types of signals to be sampled for power management purposes. For example, in one embodiment, signals selected to be sampled include clock enable signals routed to local clock distribution blocks.

The selection of which signals to sample during a particular clock cycle may correspond to how well the selection correlates to the amount of switching node capacitance within circuits 132. The selected signals to be sampled, such as clock enable signals, may overlap functional blocks in the floorplan. Therefore, the division separating, for example, circuit 132a and 132b may not correspond to a division in the floorplan. Circuits 132 consume power, and this power is to be measured in real-time. The activity level of the die associated with a current workload may correspond to values, or weights, associated with selected signals to be sampled.

In one embodiment, Power/Activity Monitor 130 may be configured to monitor and collect data from circuits 132, such as the logic values of all the given sampled signals. In one embodiment, the values of the sampled signals may be scanned out in a serial manner. Therefore, the selected signals may be sampled in a single clock cycle from each of circuits 112 and serially scanned out before the next sample is performed. After collecting the data, Power Monitor 130 may calculate an activity level estimate. One Monitor Control 132 may correspond to each circuit 132. In alternative embodiments, a Monitor Control 132 may collect data for two or more circuits 112 and calculate total power consumption estimation for those circuits 112. In yet another embodiment, one Monitor Control 132 may have a signal interface with one or more other Monitor Controls 132 (i.e., Controls 132b-132d) in order to collect data from the one or more Monitor Controls 132 (i.e., Controls 132b-132d). Then a power consumption estimate for the one or more Monitor Controls 132 may be calculated.

The signals Sample 120 and Dataout 122 may be control and data signals used for power management purposes. The interface signals between Power/Activity Monitor 130 and Functional Block 110 may comprise any necessary number of signals and communication protocols. In one embodiment, the control signal Sample 120 may be asserted for a single clock cycle only during a chosen repeating interval, such as every 100 clock cycles. In one embodiment, at a given number of clock cycles after the control signal Sample 120 is asserted, the data signal Dataout 122 may begin providing a logic value for a different sampled signal each clock cycle. In other words, the data signal Dataout 122 may be used to scan out a chain of values comprising the logic values of the sampled signals at a particular cycle. Also, in other embodiments, there may not be a single pair of signals between each Monitor Control 132 and circuit 112 pair. In an alternative embodiment, additional signals may be included in order for a Monitor Control 132 to poll a circuit 112 and for the circuit 112 to acknowledge to a Monitor Control 132 that it is ready to convey output data.

A multiple number of samples may be taken during a given time interval. The determination of the number of intermittent clock cycles to use before computing an activity level may depend on the desired accuracy and confidence of the sampled data. A spreadsheet, or a look-up table, may be generated using both statistical analysis and measurements of both the real power consumption of an application and estimated power consumption from a sampling. A confidence level and an error rate may be chosen to further develop the statistical analysis.

When the Power Monitor 130 calculates a power consumption estimate and/or activity level from the data received from Functional Block 110 over repeated intervals, the Power Monitor 130 has determined a power profile of the currently running application(s). This determination is conveyed to the Power Manager 140. The Power Manager 140 may alter an operating point of functional block 110 in order to decrease (or increase) power if the application is above (below) a threshold limit based on thresholds indicated by P-state vs Threshold circuit 150. The P-state vs threshold circuit 150 comprises data that indicated P-state transition threshold in dependence on a current P-state of the circuit. In some implementations, the type of workload currently being processed is also considered and used to determine the P-state transition thresholds. For example, the Power Manager 140 may cause a boost or a throttle of a current P-state to transition to another given P-state.

Figure 5:
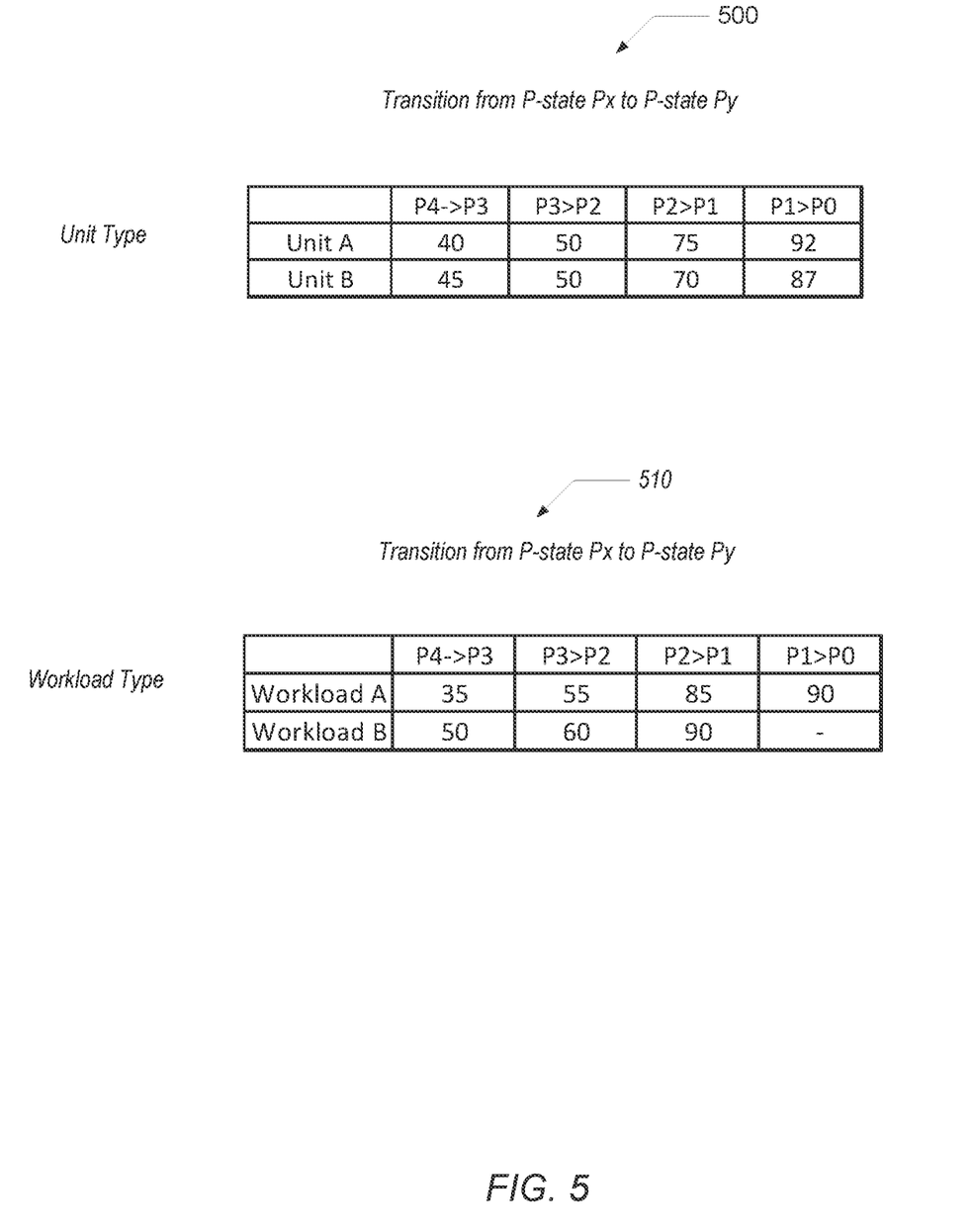
FIG. 5 is a flow diagram of one embodiment of a method for managing multiple discrete operating points to create a stable virtual operating point.

FIG. 5 provides a simplified example of the types of thresholds that are compared against when making a decision regarding a P-state transition. Two examples are illustrated. The first example 500 illustrates how the threshold used to make a P-state transition decision depends on the type of circuit being monitored. It is noted that while two circuit types are illustrated, and five P-states, other implementations include any number of each. In the examples shown, the P-state P4 represents the lowest performance state and the P-state P0 represents the highest performance state. Values shown in the tables in FIG. 5 are intended to convey relative activity levels on a scale of 0-100. However, any type of value or range of values can be used as long as they can be used to determine relative activity levels. In example 500, Circuit A is shown to require an activity level of 40 in order to transition from the state P4 to P3, an activity level of 50 in order to transition from the state P3 to P2, an activity level of 75 in order to transition from the state P2 to P1, and an activity level of 92 in order to transition from the state P1 to P0. As can be seen, the threshold to transition to a higher P-state increases as the relative level of the P-state increases. In this manner, it becomes increasingly difficult to achieve the higher P-states as the P-state of the functional block increases. An example is also provided for circuit B which is a different type of circuit than circuit A. While the values are not the same, they too increase with relative P-state.

Also shown is a table of values that identifies P-state transition thresholds based on the type of workload. In the example shown, Workload A is shown to require an activity level of 35 in order to transition from the state P4 to P3, an activity level of 55 in order to transition from the state P3 to P2, an activity level of 85 in order to transition from the state P2 to P1, and an activity level of 90 in order to transition from the state P1 to P0. Samples are also shown for Workload B. In the example of Workload B, no threshold is indicated for a transition from the state P1 to P0. This indicates that when this type of workload is executing, a transition to state P0 is not permitted. This may be due to, for example, characterizing information for the workload that indicate there is no performance benefit to increasing the P-state further.

It is noted that various combinations of information may be used to make a decision on P-state transitions. For example, the values in both example 500 based on circuit type and example 510 based on workload type may be combined in various ways for formulate a final threshold level. These and other embodiments are possible and are contemplated.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, the instructions may comprise behavioral-level descriptions or register-transfer level (RTL) descriptions of the hardware functionality in a programming language such as C, or a design language (e.g., HDL) such as Verilog, VHDL, or a database format such as GDS II stream format (GDSII). These instructions may then be read and used to fabricate hardware comprising the system (or portions of the system). In some cases, the description may be read by a synthesis tool (e.g., program code running on a computing device) to form an implementation of the design. For example, such a tool may be used to synthesize the description to produce a netlist comprising a list of gates from a synthesis library. The netlist may generally comprise a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator, such as those from vendors Cadence®, EVE®, and Mentor Graphics®. For example, in such an embodiment the instructions may be utilized to configure FPGA based hardware to perform according to the design. Numerous such embodiments are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a functional block comprising circuitry configured to generate an activity level of the functional block based at least in part on a plurality of sampled signals used by the functional block to process a workload; and
a power manager comprising circuitry configured to cause the functional block to transition from a current power-performance state (P-state) to a new P-state, based at least in part on the activity level of the functional block.

2. The computing system as recited in claim 1, wherein the power manager is further configured to generate a threshold activity level that indicates the new P-state for the functional block based at least in part on the current P-state of the functional block.

3. The computing system as recited in claim 2, wherein the threshold activity level to transition from a current P-state to the new P-state is different from a threshold activity level to transition from the new P-state to a P-state higher than the new P-state.

4. The computing system as recited in claim 1, wherein the functional block is configured to operate in any of a plurality of P-states, and the power manager is configured to increase a level of difficulty of the functional block transitioning to a higher P-state by using an increased activity level threshold as the functional block increases to higher P-states of the plurality of P-states.

5. The computing system as recited in claim 1, wherein for a given functional block, the power manager is configured to maintain a threshold activity level for transitioning between P-states of a plurality of P-states.

6. The computing system as recited in claim 5, wherein two or more threshold activity levels for transitioning between the plurality of P-states are different.

7. The computing system as recited in claim 1, wherein the power manager is configured to compare a current activity level of the functional block to one or more activity level thresholds to determine if the new P-state is indicated.

8. The computing system as recited in claim 2, wherein the threshold activity level is further based at least in part on at least one of a type of the functional block and a type of workload being executed by the functional block.

9. A method comprising:
processing a workload by one or more functional blocks;
generating, by an activity monitor, an activity level of a functional block of the one or more functional blocks based at least in part on a plurality of sampled signals used by the functional block to process a workload; and
causing, by a power manager, the functional block to transition from a first power-performance state (P-state) to a second P-state, based at least in part on the activity level of the functional block.

10. The method as recited in claim 9, further comprising generating a threshold activity level that indicates of the new P-state for the functional block based at least in part on an estimated change in relative performance per power when moving from the current P-state to the new P-state.

11. The method as recited in claim 10, wherein the threshold activity level to transition from a current P-state to the new P-state is different from a threshold activity level to transition from the new P-state to a P-state higher than the new P-state.

12. The method as recited in claim 9, wherein the functional block is configured to operate in any of a plurality of P-states, and the method further comprises increasing a level of difficulty of the functional block transitioning to a higher P-state by using an increased activity level threshold as the functional block increases to higher P-states of the plurality of P-states.

13. The method as recited in claim 9, wherein for a given functional block, the method comprises maintaining a threshold activity level for transitioning between P-states of a plurality of P-states.

14. The method as recited in claim 13, wherein two or more threshold activity levels for transitioning between the plurality of P-states are different.

15. The method as recited in claim 9, wherein a current P-state is one of a plurality of P-states in which the functional block is configured to operate.

16. The method as recited in claim 10, wherein the threshold activity level is based at least in part on at least one of a type of the functional block and a type of workload being executed by the functional block.

17. A computing system comprising:
a plurality of functional blocks, each comprising circuitry configured to process a workload;
an activity monitor comprising circuitry configured to generate an activity level of a functional block of the plurality of functional blocks based at least in part on a plurality of sampled signals used by the functional block to process the workload; and
a power manager comprising circuitry configured to:
receive an indication of the activity level from the activity monitor; and
cause the functional block to transition from a first power-performance state (P-state) to a second P-state, based at least in part on the activity level of the functional block.

18. The computing system as recited in claim 17, wherein the power manager is further configured to generate a threshold activity level that indicates the new P-state for the functional block based at least in part on an estimated change in relative performance per power when moving from the current P-state to the new P-state.

19. The computing system as recited in claim 18, wherein the threshold activity level is based in part on a performance per watt determination for the new P-state.

20. The computing system as recited in claim 17, wherein the functional block is configured to operate in any of a plurality of P-states, and the power manager is configured to increase a level of difficulty of the functional block transitioning to a higher P-state by using an increased activity level threshold as the functional block increases to higher P-states of the plurality of P-states.

* * * * *